Dec. 22, 1925.
R. POLESCHENSKY
MACHINE FOR SOWING SEEDS
Filed May 15, 1924
1,566,424
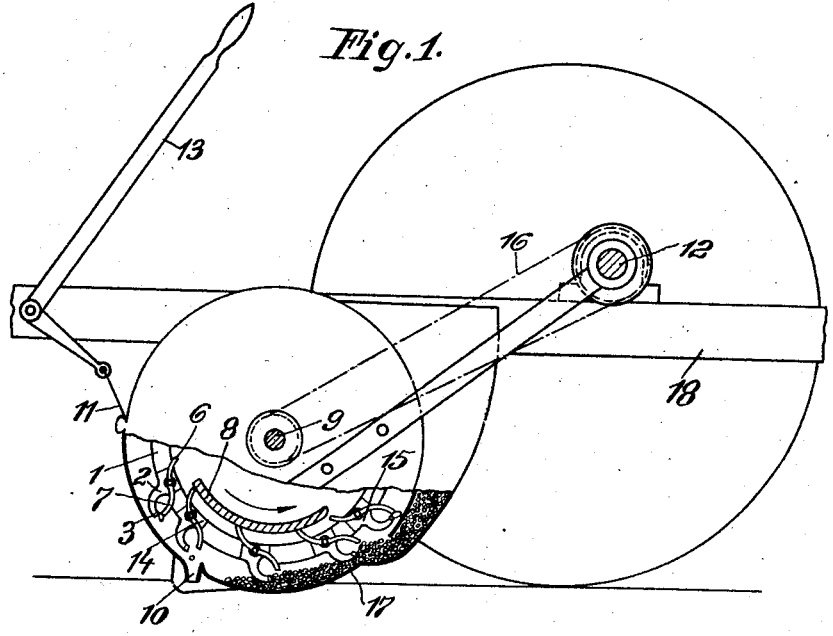
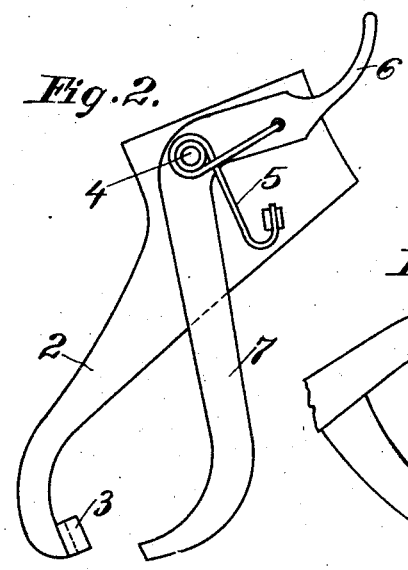
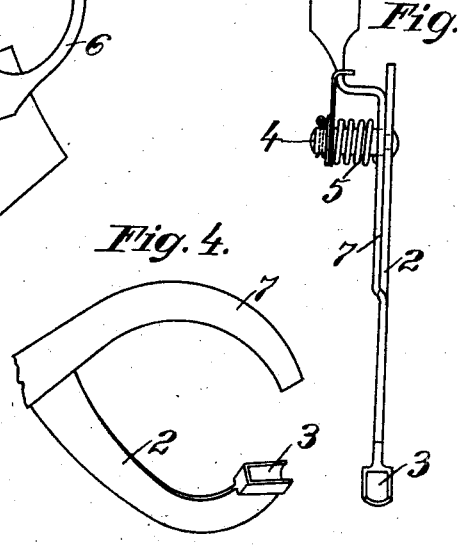
Inventor:
R. Poleschensky
by Marks & Clerk
Attys.

Patented Dec. 22, 1925.

1,566,424

UNITED STATES PATENT OFFICE.

RAIMUND POLESCHENSKY, OF WINDSHEIM, GERMANY.

MACHINE FOR SOWING SEEDS.

Application filed May 15, 1924. Serial No. 713,606.

*To all whom it may concern:*

Be it known that I, RAIMUND POLESCHENSKY, a citizen of the Republic of Austria, residing at Windsheim, Bavaria, German Republic, have invented new and useful Improvements in Machines for Sowing Seeds, of which the following is a specification.

As is well known, the germination, growth and thriving of grain laid in the soil take place under the most favourable conditions, when the grains of corn are sown at systematically determined distances apart, have sufficient space, air and light for development and do not hinder each other's growth, as is the case when they are sown by the ordinary machines. The present invention makes it possible to sow the grain in this manner by mechanical means and consists in a sowing machine, in which a plurality of grippers on a rotating disc each scoop up a single grain out of the grain hopper and deposit it at accurately regulable distances in the soil.

The accompanying drawing represents the main parts of a constructional example of a machine for sowing seeds, Fig. 1 showing the separate parts of the machine in side elevation as they are scooping up, conveying and depositing the grain, Fig. 2 a single gripper in the open position, Fig. 3 a plan view of the gripper and Fig. 4 the opened end of the gripper to an enlarged scale.

The grippers for scooping up the grain, which are all exactly alike, are mounted on a continuously rotating disc 1. Each of the grippers consists, as shown in Figs. 2 and 3 of a scooping member 2, which is fixed to the rotating disc and is provided with a recessed end 3 and a gripping lever 7, which is pivoted to the part 2 by means of a bolt 4 under the action of the spring 5 and is provided with an extension 6. The driving shaft 12 operates, for instance by means of a chain 16, a shaft 9, which is journalled in the seed depositing part of the machine, and is adapted to cause the disc 1 to rotate about the shaft 9. An eccentric 8 or the like is fixed to the stationary wall 11 and causes the grippers on the rotating disc 1 to open and close as they slide past it. The cup-like recessed end of the part 2 of the gripper is so arranged that, as it passes through the lower portion of the hopper it is open from below and in the direction of rotation of the disc but closed on top. Said cup-like end, when open (see 15 in Fig. 1), picks up a single grain from the seed hopper 17, the size of which is such that it is only capable of holding one grain, and, on the disc 1 continuing its rotation, passes out of the grain lying in the hopper. At the same time the extension 6 slides off the eccentric 8, so that the spring 5 can press down the lever 7 on to the part 2 and can enclose the single grain in the recessed end 3. On the rotation continuing, the extension 6 strikes against the eccentric 8, raises the lever 7 and causes the released grain (see 14 in Fig. 1) to fall out of the dished end 3 through the funnel 10 directly into the drill.

The sowing device is preferably pivotally mounted on the frame 18, so that it trails on the ground and the height from which the grain drops, when liberated from the gripper, may be as small as possible.

The advantage as compared with other seed sowing machines consists in this, that the gripper deposits the grain directly into the drill, thus preventing any variation in the distance between the deposited grains, such as is the case in other seed sowing machines, in which the grain falls from a greater height.

By varying the speed of revolution of the driving shaft 12, any desired distance may be obtained between the separate grains, when they are being sown. The lever 13 serves the purpose of raising and lowering the single seed sowing apparatus or several such apparatus and at the same time co-acts with another lever, not shown in the drawing, for putting the apparatus into and out of operation.

What I claim is:

A machine for sowing seeds comprising a hopper, a discharge spout communicating with the lower rear portion of the hopper, a disc rotatable in said hopper, a plurality of picking devices carried by the disc and movable through the seeds contained in the hopper, each of the picking devices including a fixed member carried by the disc having a recessed outer extremity providing a seed receiving cup and a pivoted member having a reduced outer extremity adapted to engage a seed contained in the cup, each cup being so arranged that as it passes through the lower portion of the hopper it is open from below and in the direction of rotation of the disc but closed on top, means normally tending to move the pivoted member of each picking device in the direction of the fixed member and means for disengaging the pivoted member from the seed incident to the movement of each picking device to a position in vertical line with the seed discharge spout.

In testimony whereof I have signed my name to this specification.

RAIMUND POLESCHENSKY.